United States Patent
Wu et al.

(10) Patent No.: US 10,072,146 B2
(45) Date of Patent: Sep. 11, 2018

(54) COMPOSITIONS, METHODS OF MAKING THE SAME, AND ARTICLES PREPARED FROM THE SAME

(75) Inventors: Xiaosong Wu, Pearland, TX (US); Jose M. Rego, Houston, TX (US); Kim L. Walton, Lake Jackson, TX (US); Brian W. Walther, Clute, TX (US); Michael D. Read, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 773 days.

(21) Appl. No.: 13/991,545

(22) PCT Filed: Dec. 29, 2011

(86) PCT No.: PCT/US2011/067888
§ 371 (c)(1),
(2), (4) Date: Aug. 12, 2013

(87) PCT Pub. No.: WO2012/092491
PCT Pub. Date: Jul. 5, 2012

(65) Prior Publication Data
US 2013/0316111 A1  Nov. 28, 2013

Related U.S. Application Data

(60) Provisional application No. 61/428,529, filed on Dec. 30, 2010.

(51) Int. Cl.
*C08L 47/00* (2006.01)
*C08L 23/16* (2006.01)
*C08L 23/10* (2006.01)

(52) U.S. Cl.
CPC ............. *C08L 47/00* (2013.01); *C08L 23/16* (2013.01); *C08L 23/10* (2013.01); *Y10T 428/139* (2015.01)

(58) Field of Classification Search
CPC .. C08L 23/16; C08L 23/12; C08L 9/00; C08L 2666/04; C08L 2666/06; C08L 23/02; C08L 23/08; C08L 25/06; C08L 25/08; C08L 2666/02; C08L 2666/08; C08L 21/00; C08L 23/10; C08L 2205/025; C08L 23/01; C08F 210/18; C08F 236/20; C08F 2500/03; C08F 2500/12; Y10T 428/139; Y10T 428/1352
USPC .......... 428/36.9, 35.7, 36.8, 542.8; 524/526; 525/237
See application file for complete search history.

(56) References Cited

U.S. PATENT DOCUMENTS

| 5,656,693 | A | 8/1997 | Ellul et al. |
|---|---|---|---|
| 2005/0140049 | A1 | 6/2005 | James et al. |
| 2006/0199910 | A1 | 9/2006 | Walton et al. |
| 2007/0225446 | A1 | 9/2007 | Sadayuki et al. |
| 2008/0033089 | A1 | 2/2008 | Ellul et al. |

FOREIGN PATENT DOCUMENTS

| JP | 6287375 | 10/1994 |
|---|---|---|
| JP | A-1998045966 | 2/1998 |
| WO | WO2006101928 | 9/2006 |
| WO | WO2009123609 | 10/2009 |
| WO | WO2011008837 | 1/2011 |

OTHER PUBLICATIONS

PCT Search Report from PCT counterpart Application No. PCT/US2011/067888.
PCT IPRP from PCT counterpart Application No. PCT/US2011/067888.
EP Office Action dated Aug. 6, 2013; from EP counterpart Application No. 11811292.9.
Chinese First Office Action dated Apr. 30, 2015 for counterpart Chinese Application No. 201180068789.9, 10 pages.
Chinese Response to Office Action dated Nov. 15, 2015; from Chinese counterpart Application No. 201180068789.9.
Japanese Office Action dated Aug. 20, 2015; from Japanese counterpart Application No. 2013-547672.
Japanese Response to Office Action dated Nov. 12, 2015; from Japanese counterpart Application No. 2013-547672.
Instructions to EP Office Action dated Jan. 24, 2014; from EP counterpart Application No. 11811292.9.
Response to EP Office Action dated Feb. 17, 2014; from EP counterpart Application No. 11811292.9.
Chinese Office Action dated Mar. 21, 2016; from Chinese counterpart Application No. 201180068789.9.
Chinese Response to Office Action dated Jun. 5, 2016; from Chinese counterpart Application No. 201180068789.9.
Chinese Office Action dated Aug. 16, 2016; from Chinese counterpart Application No. 201180068789.9.

*Primary Examiner* — Yan Lan
(74) *Attorney, Agent, or Firm* — Husch Blackwell LLP

(57) ABSTRACT

A composition comprising at least the following components: (A) a first composition comprising the following: i) a first interpolymer comprising, in polymerized form, ethylene, an α-olefin, and a nonconjugated polyene; ii) a second interpolymer comprising, in polymerized form, ethylene, an α-olefin and a nonconjugated polyene; and wherein the first composition has an MWD less than, or equal to, 3.5, a Mooney Viscosity (ML (1+4 @125° C.)) greater than, or equal to, 80, and an [(ML(1+4 @125° C.))/Mw(conv)] *1000 greater than 0.429 mole/g; (B) a thermoplastic polymer; and (C) a vulcanization agent is provided. A cross-linked composition made by heating one or more of the inventive compositions is also provided. Articles made from one or more of the inventive compositions are also provided.

17 Claims, No Drawings

COMPOSITIONS, METHODS OF MAKING THE SAME, AND ARTICLES PREPARED FROM THE SAME

BACKGROUND OF THE INVENTION

Thermoplastic vulcanizates (TPVs) are produced via dynamic vulcanization of immiscible blends of a rubber and a thermoplastic, i.e., the selective crosslinking of the rubber while melt mixing with the thermoplastic. The resulting TPVs comprise cross-linked rubber particles dispersed in a thermoplastic matrix, which have both elasticity and melt processability. The majority of commercial TPVs are based on blends of ethylene/propylene/diene monomer (EPDM)-type interpolymers with polypropylene (PP), and cross-linked with phenolic or peroxide curing agents. EPDMs typically used in commercial TPV formulations have very high molecular weights; e.g., Mooney viscosity (ML (1+4@125° C.)) greater than, or equal to, 200. To improve processability, extender oil is often added to the EPDM polymer to reduce the apparent viscosity during production. The resulting bale form of EPDM has disadvantages in handling. For example, the bale form of EPDM requires an additional grinding step before being fed into an extruder.

Oil-extended EPDM interpolymers have limited compounding flexibility, because such interpolymers contain a fixed level and/or certain type of oil in a pre-compounding state. Typically regular non-clear paraffinic oil is used as the extender oil. The regular paraffinic oil contains aromatic and polar fractions, which may be undesirable in the compounded formulation. For example, such oils are generally dark colored and are undesirable for producing white or colored TPVs. The level of oil may also restrict compounding options. For example, a TPV formulation with very low oil concentration is not achievable with an oil-extended EPDM because most oil extended EPDM has 75 PHR or more oil in it.

PCT Publication WO2009/123609A1 discloses a process for preparing a thermoplastic vulcanizate, the process comprising charging a reactor with an olefinic copolymer rubber, where the olefinic copolymer rubber is character by a multimodal molecular weight, an average branching index of greater than 0.8, includes less than 10 parts by weight oil per 100 parts by weight rubber, includes less than 1 parts by weight non-rubber particulate, per 100 parts by weight rubber, and is in the form of granules having a particle size less than 8 mm. The reactor is charged, contemporaneously, or sequentially with respect to the rubber, with a thermoplastic resin, an oil, and a cure system, and the rubber, the thermoplastic resin, the oil, and the cure system are melt mixed, and the rubber is dynamically vulcanized.

U.S. Patent Publication No. 20080033089 discloses a thermoplastic vulcanizate composition comprising a dynamically-cured rubber; from about 20 to about 300 parts by weight of a thermoplastic resin per 100 parts by weight rubber and from about 30 to about 250 parts by weight additional oil per 100 parts by weight rubber. The rubber comprises a multimodal polymer composition cured with a curing agent, the multimodal polymer composition comprising 45 to 75 wt % of a first polymer fraction and 25 to 55 wt % of a second polymer fraction, each comprising ethylene, a $C_3$-$C_{10}$ α-olefin, and a non-conjugated diene. The polymer fractions have been polymerized using a Ziegler-Natta catalyst system. The first polymer fraction has a Mooney viscosity of, greater than, or equal to, about 150 ML(1+4@125° C.), and the second polymer fraction has a Mooney viscosity of about 20 ML to about 120 ML; and about 10 phr to about 50 phr of an extender oil. This publication also discloses a method of producing the thermoplastic vulcanizate.

Despite the variety of EPDM-based formulations currently known and used in TPVs, there is a need for a formulation formed from an EPDM in the form of free flowing pellets, as opposed to highly oil extended bales, and which provides the same, or better, balance of properties as compared to the properties of conventional TPV formulations prepared using bale form, ultra high molecular weight EPDMs. There is further a need for such TPV formulations which provide ease in handling and formulation flexibility. Various embodiments of the following invention meet some and/or all of these needs.

SUMMARY OF THE INVENTION

The invention provides a composition comprising at least the following components: (A) a first composition comprising the following: i) a first interpolymer comprising, in polymerized form, ethylene, an α-olefin, and a nonconjugated polyene; ii) a second interpolymer comprising, in polymerized form, ethylene, an α-olefin and a nonconjugated polyene; and wherein the first composition has an MWD less than, or equal to, 3.5, a Mooney Viscosity (ML (1+4, 125° C.)) greater than, or equal to, 80, and an [(ML(1+4, 125° C.))/Mw(conventional)]*1000 greater than 0.429 mole/g; (B) a thermoplastic polymer; and (C) a vulcanization agent.

The invention is described in priority document U.S. Provisional Application No. 61/428,529, filed on Dec. 30, 2011, the disclosure of which is incorporated herein by reference.

DETAILED DESCRIPTION OF THE INVENTION

Inventive Compositions:

As discussed above, the invention provides a composition comprising: (A) a first composition comprising the following: i) a first interpolymer comprising, in polymerized form, ethylene, an α-olefin, and a nonconjugated polyene; ii) a second interpolymer comprising, in polymerized form, ethylene, an α-olefin and a nonconjugated polyene; and wherein the first composition has an MWD less than, or equal to, 3.0, a Mooney Viscosity (ML (1+4, 125° C.)) greater than, or equal to, 80, and an [(ML(1+4, 125° C.))/Mw(conv)]*1000 greater than 0.429 mole/g; (B) a thermoplastic polymer; and (C) a vulcanization agent. In one embodiment, the composition further comprises at least one additive selected from fillers, crosslinking agents, foaming agents, or combinations thereof. In one embodiment, the inventive composition is in free-flowing pellet form (at ambient conditions). An inventive composition may comprise a combination of two or more embodiments as described herein. In one embodiment, the first composition has a Mooney viscosity (ML, 1+4, 125° C.) greater than, or equal to, 70, preferably greater than, or equal to, 75, and more preferably greater than, or equal to, 80. In one embodiment, the first composition has a weight average molecular weight (Mw(conv)) from 150,000 to 230,000 g/mole, preferably from 170,000 to 230,000 g/mole.

In a further embodiment the composition further comprises an additional polymer selected from the group of propylene-based copolymers and ethylene-based copolymers, wherein the additional polymer comprises no more than 50 percent by weight of the total weight of the thermoplastic polymer plus the additional polymer. All individual values and subranges from at least 50 percent by weight are disclosed herein and included herein; for example, the additional polymer may be present at an upper limit of 50, or 40, or 30, or 20 percent by weight based on the total weight of the thermoplastic polymer plus the additional polymer.

The First Composition and Components Thereof:

The inventive composition comprises a first composition, which comprises: a first interpolymer comprising, in polymerized form, ethylene, an α-olefin and a nonconjugated polyene; and a second interpolymer comprising, in polymerized form, ethylene, an α-olefin and a nonconjugated polyene; wherein the first composition has MWD (conv) less than, or equal to, 3.5, a Mooney Viscosity (ML(1+4, 125° C.)) of greater than, or equal to 80, and an [(ML(1+4, 125° C.)/Mw(conv)]*1000 greater than 0.429 mole/g. In one embodiment, the first composition has a molecular weight distribution, MWD (conv) of less than, or equal to, 3.0. All individual values and subranges from less than, or equal to, 3.0 are included herein and disclosed herein; for example, the MWD of the first composition can be from an upper limit of 3.0; or in the alternative, from an upper limit of 2.8; or in the alternative, from an upper limit of 2.5. In one embodiment, the first composition has a Mooney Viscosity (ML(1+4, 125° C.)) from 80 to 200. All individual values and subranges from 80 to 200 are included herein and disclosed herein; for example, the Mooney Viscosity of the first composition can be from a lower limit of 80, 100, 120, 140, 160, 180, or 190 to an upper limit of 100, 120, 140, 160, 180, or 200. For example, the Mooney Viscosity of the first composition may be in the range of from 80 to 200, or in the alternative, the Mooney Viscosity of the first composition may be in the range of from 120 to 200, or in the alternative, the Mooney Viscosity of the first composition may be in the range of from 140 to 180, or in the alternative, the Mooney Viscosity of the first composition may be in the range of from 160 to 180.

In one embodiment, the first composition has an overall ethylene content of greater than, or equal to, 65 wt %, based on the total weight of the interpolymer in the first composition. All individual values and subranges from a lower limit of 65 wt % are disclosed herein and included herein, for example, the weight percent of ethylene in the first composition may be from a lower limit of 66 wt %, or in the alternative, the weight percent of ethylene in the first composition may be from a lower limit of 68 wt %, or in the alternative, the weight percent of ethylene in the first composition may be from a lower limit of 70 wt %, or in the alternative, the weight percent of ethylene in the first composition may be from an lower limit of 72 wt %. In one embodiment, the first composition has an overall ethylene content from 67 to 77 wt % based on the total weight of the interpolymer in the first composition. In another embodiment, the first composition has an overall ethylene content from 65 wt % to 74 wt %. In one embodiment, the first composition comprises from 40 to 60% by weight of the first interpolymer and from 40 to 60% by weight of the second interpolymer. All individual values and subranges from 40 to 60 wt % of the first interpolymer are included herein and disclosed herein; for example, the first interpolymer may be from a lower limit of 40, 45, 50, or 55 wt % of the total first composition to an upper limit of 45, 50, 55, or 60 wt % of the total first composition. Likewise, all individual values and subranges from 40 to 60 wt % of the second interpolymer are included herein and disclosed herein; for example, the second interpolymer may be from a lower limit of 40, 45, 50, or 55 wt % of the total first composition to an upper limit of 45, 50, 55, or 60 wt % of the total first composition.

In one embodiment, the difference (absolute) in ethylene content between the first interpolymer and the second interpolymer of the first composition is from 5 to 10 wt %. All individual values and subranges from 5 to 10 wt % are included herein and disclosed herein; for example, the difference (absolute) in ethylene content between the first interpolymer and the second interpolymer can be from a lower limit of 5, 6, 7, 8, or 9 wt % to an upper limit of 6, 7, 8, 9, or 10 wt %. For example, the difference (absolute) in ethylene content between the first interpolymer and the second interpolymer may be in the range of from 5 to 10 wt %, or in the alternative, the difference (absolute) in ethylene content between the first interpolymer and the second interpolymer may be in the range of from 6 to 10 wt %, or in the alternative, the difference (absolute) in ethylene content between the first interpolymer and the second interpolymer may be in the range of from 7 to 10 wt %, or in the alternative, the difference (absolute) in ethylene content between the first interpolymer and the second interpolymer may be in the range of from 8 to 10 wt %, or in the alternative, the difference (absolute) in ethylene content between the first interpolymer and the second interpolymer may be in the range of from 5 to 9 wt %, or in the alternative, the difference (absolute) in ethylene content between the first interpolymer and the second interpolymer may be in the range of from 5 to 7 wt %. In one embodiment, the first composition has a low shear viscosity (η at 0.1 rad/sec) less than, or equal to, 140,000 Pa·sec. All individual values and subranges less than, or equal to, 140,000 Pa sec are disclosed herein and included herein; for example, the low shear viscosity of the first composition can be from an upper limit of 25,000 Pa sec; or in the alternative, the low shear viscosity of the first composition can be from an upper limit of 50,000 Pa sec; or in the alternative, the low shear viscosity of the first composition can be from an upper limit of 75,000 Pa sec; or in the alternative, the low shear viscosity of the first composition can be from an upper limit of 100,000 Pa sec.

In one embodiment, the first composition has a tan delta greater than, or equal to, 0.5, as measured by DMS method discussed hereinafter. All individual values and subranges greater than, or equal to, 0.5 are disclosed herein and included herein; for example, the tan delta of the first composition can be from a lower limit of 0.5; or in the alternative, from a lower limit of 0.6; or in the alternative, from a lower limit of 0.7; or in the alternative, from a lower limit of 0.8. In one embodiment, the first composition has a property [(ML(1+4, 125° C.))/Mw(conv)]·1000 greater than, or equal to, 0.429 mole/g. All individual values and subranges greater than, or equal to, 0.429 mole/g are disclosed herein and included herein; for example, the [(ML(1+4, 125° C.))/Mw(conv)]·1000 of the first composition can be from a lower limit of 0.429 mole/g; or in the alternative, the [(ML(1+4, 125° C.))/Mw(conv)]·1000 of the first composition can be from a lower limit of 0.45 mole/g; or in the alternative, the [(ML(1+4, 125° C.))/Mw(conv)]·1000 of the first composition can be from a lower limit of 0.55 mole/g; or in the alternative, the [(ML(1+4, 125° C.))/Mw(conv)]·1000 of the first composition can be from a lower limit of 0.75 mole/g. In one embodiment, the first composition has an [Mw(abs)]/[Mw(conv)] less than, or equal to, 1.2. All individual values and subranges less than, or equal to, 1.2 are disclosed herein and included herein; for example, the [Mw(abs)]/[Mw(conv)] of the first composition can be from an upper limit of 1.2; or in the alternative, the [Mw(abs)]/

[Mw(conv)] of the first composition can be from an upper limit of 1.1; or in the alternative, the [Mw(abs)]/[Mw(conv)] of the first composition can be from an upper limit of 1.0; or in the alternative, the [Mw(abs)]/[Mw(conv)] of the first composition can be from an upper limit of 0.9. In one embodiment, the first composition may be pelletized. The first composition may comprise a combination of two or more embodiments as described herein.

Ethylene/α-Olefin/Polyene Interpolymers Useful in the First Composition:

The first and second ethylene/α-olefin/nonconjugated polyene interpolymers have polymerized therein $C_2$ (ethylene), at least one α-olefin and a nonconjugated polyene. Suitable examples of α-olefins include the $C_3$-$C_{20}$ α-olefins. Suitable examples of nonconjugated polyenes include the $C_4$-$C_{40}$ nonconjugated polyenes. In a preferred embodiment, the interpolymer is an ethylene/propylene/diene interpolymer, and further an EPDM terpolymer. In a further embodiment, the diene is 5-ethylidene-2-norbornene (ENB). The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 positions with $C_1$-$C_{20}$ hydrocarbyl groups. The α-olefin is preferably a $C_3$-$C_{20}$ aliphatic compound, preferably a $C_3$-$C_{16}$ aliphatic compound, and more preferably a $C_3$-$C_{10}$ aliphatic compound. Preferred ethylenically unsaturated monomers include 4-vinylcyclohexene, vinylcyclohexane, and $C_3$-$C_{10}$ aliphatic α-olefins (especially propylene, isobutylene, 1-butene, 1-pentene, 1-hexene, 3-methyl-1-pentene, 4-methyl-1-pentene, 1-octene, 1-decene and 1-dodecene), and more preferably $C_3$-$C_{10}$ aliphatic α-olefins. A more preferred $C_3$-$C_{10}$ aliphatic α-olefin is selected from the group consisting of propylene, 1-butene, 1-hexene and 1-octene, and more preferably propylene. In a preferred embodiment, the interpolymer is an EPDM interpolymer. In a further embodiment, the diene is ENB. In one embodiment, the nonconjugated polyene is a $C_6$-$C_{15}$ straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB. The ethylene/α-olefin/nonconjugated polyene interpolymers are prepared in the presence of at least one catalyst. In one embodiment, the at least one catalyst is, for example, a single site catalyst, such as a constrained geometry catalyst (CGC), for example, a monocyclopentadienyl titanium complex; or a post metallocene catalyst.

In one embodiment, the at least one catalyst is a single site catalyst. In one embodiment, the catalyst is selected from metallocene catalysts, constrained geometry catalysts, and post metallocene catalysts. In one embodiment, the at least one catalyst is a post metallocene catalyst. Suitable post metallocene catalysts are described in U.S. Publication No. 2005/0164872 and International Publication No. WO 2007/136494; each incorporated herein by reference.

In a preferred embodiment, first interpolymer differs in one or more features, such as amount of a monomeric constituent, density, crystalline melting point (Tm), Mooney viscosity, or a molecular weight (Mn, Mw), from the second interpolymer. In a preferred embodiment, the first ethylene/α-olefin/nonconjugated polyene interpolymer comprises a majority amount of polymerized ethylene, based on the weight of the first ethylene/α-olefin/nonconjugated polyene interpolymer. In one embodiment, the at least one catalyst is a constrained geometry catalyst. Suitable constrained geometry catalysts are described in U.S. Pat. Nos. 5,272,236 and 5,278,272; each incorporated herein by reference.

In one embodiment, the first interpolymer has a molecular weight distribution (MWD) less than 3.0, preferably less than 2.8. In a further embodiment, the MWD is derived from conventional GPC (GPC(conv)). In another embodiment, the MWD is derived from absolute GPC (GPC(abs)). In one embodiment, the second interpolymer has a molecular weight distribution (MWD) less than 3.0, preferably less than 2.8, more preferably less than 2.4. In a further embodiment, the MWD is derived from conventional GPC. In another embodiment, the MWD is derived from absolute GPC. In one embodiment, the first interpolymer and the second interpolymer, each has a molecular weight distribution (MWD) less than 3.0, preferably less than 2.8, more preferably less than 2.4. In a further embodiment, the MWD is derived from conventional GPC. In another embodiment, the MWD is derived from absolute GPC.

In one embodiment of the invention, the first ethylene/α-olefin/nonconjugated polyene interpolymer has a molecular weight distribution ($M_{w(Conv)}/M_{n(Conv)}$) from 2 to 3.5, preferably from 2.05 to 3.0 and more preferably from 2.05 to 2.8, and even more preferably from 2.05 to 2.5. In a preferred embodiment, the interpolymer is an ethylene/propylene/diene interpolymer, and further an EPDM terpolymer. In a further embodiment, the diene is ENB. In one embodiment, the first ethylene/α-olefin/nonconjugated polyene interpolymer has a Mooney viscosity, ML(1+4) at 125° C., greater than, or equal to 70, preferably greater than 75, more preferably greater than 80. In a preferred embodiment, the interpolymer is an ethylene/propylene/diene interpolymer, and further an EPDM terpolymer. In a further embodiment, the diene is ENB. In one embodiment, the first ethylene/α-olefin/nonconjugated polyene interpolymer has a Mooney viscosity, ML(1+4) at 125° C., less than 200, preferably less than, or equal to, 160, more preferably less than, or equal to, 120. In a preferred embodiment, the interpolymer is an ethylene/propylene/diene interpolymer, and further an EPDM terpolymer. In a further embodiment, the diene is ENB. Mooney viscosity is that of the neat interpolymer (or calculated viscosity of neat polymer for polymers that contain a filler, such as carbon black, and/or an oil). The neat polymer refers to the polymer without filler and without oil. In one embodiment, the first ethylene/α-olefin/nonconjugated polyene interpolymer has a $Mn_{(conv)}$ from 50,000 to 120,000 g/mole, preferably from 80,000 to 100,000 g/mole. In one embodiment, the first ethylene/α-olefin/nonconjugated polyene interpolymer has a $Mw_{(conv)}$ from 150,000 to 280,000 g/mole, preferably from 180,000 to 280,000 g/mole.

In one embodiment, the first interpolymer has a diene content of equal to, or greater than, 0.1% by weight. All individual values and subranges of equal to, or greater than, 0.1% by weight are disclosed herein and included herein; for example, the diene content of the first interpolymer may be from a lower limit of 0.1, 0.5, 1, 1.5, 5, or 10 wt %. For each diene, the NMR and FTIR methods will provide the same results. In one embodiment, the first interpolymer has a crystallization temperature, Tc, greater than or equal to 28° C. All individual values and subranges from greater than or equal to 28° C. are included herein and disclosed herein. For example, the first interpolymer may have a Tc greater than or equal to 28, 30, 32 or 34° C. In one embodiment, the second interpolymer has a diene content of equal to, or greater than, 0.1% by weight. All individual values and subranges of equal to, or greater than, 0.1% by weight are disclosed herein and included herein; for example, the diene content of the second interpolymer may be from a lower limit of 0.1, 0.5, 1.5, 5, or 10 wt %.

The first interpolymer may comprise a combination of two or more embodiments as described herein. In one embodiment, the first interpolymer and the second interpolymer, each has a molecular weight distribution (MWD) less than 3.0, preferably less than 2.8, more preferably less than 2.4. In a further embodiment, the MWD is derived from conventional GPC. In another embodiment, the MWD is derived from absolute GPC. In one embodiment, the ratio of the weight average molecular weight of the first interpolymer to the weight average molecular weight of the second interpolymer, $M_{w(conv, first)}/M_{w(conv, second)}$, is greater than 1.05, preferably greater than 1.10, and more preferably greater than 1.15, and even more preferably greater than 1.20.

In one embodiment, the ratio of the polyene content in the second interpolymer to the polyene content in the first interpolymer (polyene (2)/polyene (1)) is greater than 1.0, preferably greater than 1.1, and more preferably greater than 1.2. In one embodiment, the ratio of the polyene content in the second interpolymer to the polyene content in the first interpolymer (polyene (2)/polyene (1)) is less than 3.0, preferably less than 2.0, and more preferably less than 1.5. In one embodiment, the difference (absolute) in the polyene content of the second interpolymer and the first interpolymer (polyene (2)−polyene (1)) is greater than 0.3 weight percent, preferably greater than 0.5 weight percent, more preferably greater than 1.0 weight percent, and even more preferably greater than 1.2 weight percent. In one embodiment, the difference (absolute) in the polyene content of the second interpolymer and the first interpolymer (polyene (2)−polyene (1)) is less than 2.0 weight percent, preferably less than 1.8 weight percent, more preferably less than 1.6 weight percent. In one embodiment, the difference (absolute) in the polyene content of the second interpolymer and the polyene content of the first interpolymer (polyene (2)−polyene (1)) is less than 5 weight percent, preferably less than 4 weight percent, and more preferably less than 3 weight percent. In one embodiment, the total polyene content is less than, or equal to, 8 weight percent, preferably less than, or equal to, 7 weight percent, based on the sum weight of the first interpolymer and second interpolymer.

In one embodiment, the first interpolymer comprises from 2.8 to 5.5 weight percent, preferably from 3.5 to 5.5 weight percent of the polyene, based on the weight of the interpolymer. In one embodiment, the first interpolymer comprises from 2.8 to 4.5 weight percent, preferably from 3.5 to 4.5 weight percent of the polyene, based on the weight of the interpolymer. In one embodiment, the second interpolymer comprises from 4.5 to 9 weight percent, preferably from 4.8 to 8 weight percent, and more preferably from 5 to 6.9 weight percent of the polyene, based on the weight of the interpolymer. In one embodiment, the second interpolymer comprises from 5 to 6 weight percent of the polyene, based on the weight of the interpolymer. In one embodiment, the first interpolymer comprises, in polymerized form, from 60 to 70 weight percent ethylene, preferably from 62 to 66 weight percent ethylene, based on the weight of the interpolymer. In one embodiment, the second interpolymer comprises, in polymerized form, from 64 to 80 weight percent ethylene, preferably from 66 to 76 weight percent ethylene, more preferably 68 to 73 based on the weight of the interpolymer.

In one embodiment, the ratio of the ethylene content in the second interpolymer to the ratio of ethylene content in the first interpolymer, EE(2)/EE(1) is greater than, or equal 1.05, preferably greater than, or equal to, 1.1, more preferably greater than, or equal to, 1.2.

In one embodiment, the difference in ethylene content in the first and second interpolymers is greater than, or equal to, 2 weight percent, preferably greater than, or equal to, 4 weight percent, as determined by the weight of each interpolymer.

In one embodiment, the difference in ethylene content in the first and second interpolymers is greater than, or equal to, 6 weight percent, preferably greater than, or equal to, 8 weight percent, as determined by the weight of each interpolymer.

In one embodiment, the first interpolymer has a Mooney viscosity (ML, 1+4, 125° C.) greater than 40, preferably greater than 45. In one embodiment, the second interpolymer has a Mooney viscosity (ML, 1+4, 125° C.) greater than 40, preferably greater than 45. In one embodiment, the first interpolymer has a Mooney viscosity (ML, 1+4, 125° C.) greater than 40, preferably greater than 45, and the second interpolymer has a Mooney viscosity (ML, 1+4, 125° C.) greater than 35, preferably greater than 40, more preferably greater than 45. In one embodiment, the ratio of the Mooney viscosities (ML, 1+4, 125° C.) of the first and second interpolymers (ML(first)/ML(second)) is less than 2.5, preferably less than 2.2.

In one embodiment, the first interpolymer has a weight average molecular weight (Mw(conv)) less than, or equal to, 320,000 g/mole. In one embodiment, the first polymer has a weight average molecular weight (Mw(conv)) from 170,000 to 300,000 g/mole. In one embodiment, the first polymer has a weight average molecular weight (Mw(conv)) from 180,000 to 280,000 g/mole, preferably from 190,000 to 250,000 g/mole. In one embodiment, the first composition has a weight average molecular weight (Mw(conv)) from 150,000 to 230,000 g/mole, preferably from 170,000 to 230,000 g/mole.

In one embodiment, the first composition comprises 40 to 50 weight percent of the first interpolymer, and 60 to 50 weight percent of the second interpolymer, and wherein each weight percentage is based on the sum weight of the first interpolymer and the second interpolymer. In one embodiment, the first composition comprises 43 to 47 weight percent of the first interpolymer, and 57 to 53 weight percent of the second interpolymer, and wherein each weight percentage is based on the sum weight of the first interpolymer and the second interpolymer.

In one embodiment, the first interpolymer and the second interpolymer are prepared sequentially in at least two reactors. In a further embodiment, the first interpolymer is prepared first, in a first reactor, and then the second interpolymer is prepared in a second reactor. In another embodiment, the second interpolymer is prepared first, in a first reactor, and then the first interpolymer is prepared in a second reactor.

In one embodiment, the first interpolymer is an EPDM(1), and the second interpolymer is an EPDM(2). In a further embodiment, the diene in EPDM(1) is 5-ethylidene-2-norbornene (ENB), and the diene in EPDM(2) is 5-ethylidene-2-norbornene (ENB).

The first interpolymer may comprise a combination of two or more embodiments as described herein. The second interpolymer may comprise a combination of two or more embodiments as described herein. An ethylene/α-olefin/nonconjugated polyene interpolymer may comprise a combination of two or more embodiments as described herein. An ethylene/α-olefin/diene interpolymer may comprise a combination of two or more embodiments as described herein. An ethylene/propylene/diene terpolymer may comprise a combination of two or more embodiments as described herein. A first composition may comprise a combination of two or more embodiments as described herein.

Exemplary Thermoplastic Polymers Useful in the Inventive Composition:

The inventive composition further comprises a thermoplastic polymer. In one embodiment, the thermoplastic polymer is present in an amount from 30 to 150 PHR, based on the total weight of the first composition. All individual values and subranges from 30 to 150 PHR are included herein and disclosed herein; for example, the amount of the thermoplastic polymer in the inventive composition may be from a lower limit of 30, 50, 70, 100, or a 130 PHR to an upper limit of 50, 70, 100, 130 or 150 PHR. For example, the amount of thermoplastic polymer in the inventive composition may be in the range from 30 to 150 PHR; or in the alternative, from 30 to 70 PHR; or in the alternative, from 30 to 130 PHR; or in the alternative, from 50 to 100 PHR; or in the alternative, from 70 to 150 PHR. In one specific embodiment of the inventive composition, the thermoplastic polymer is present in an amount from 30 to 100 PHR, based on the total weight of the first composition. In one specific embodiment of the inventive composition, the thermoplastic polymer is present in an amount from 30 to 70 PHR, based on the total weight of the first composition.

In some embodiments, the thermoplastic polymer is a propylene-based polymer. In a further embodiment, the propylene-based polymer is selected from the group consisting of polypropylene homopolymer, polypropylene copolymer, and combinations thereof.

In one embodiment, the propylene-based polymer has a heat of fusion (ΔHf), as determined by DSC, greater than, or equal to, 75 J/g, or greater than, or equal to, 80 J/g, or greater than, or equal to, 85 J/g.

In one embodiment, the propylene-based polymer has a melt flow rate (MFR) from 0.2 to 50. All individual values and subranges from 0.2 to 50 are included herein and disclosed herein; for example, the MFR of the thermoplastic polymer may be from a lower limit of 0.2, 0.3, 0.5, 2, 10, 25 or 45, to an upper limit of 2, 10, 25, 45 or 50. For example, the MFR of the thermoplastic polymer may be in the range from 0.2 to 50; or in the alternative, from 2 to 25; or in the alternative, from 10 to 50. In one embodiment, the thermoplastic polymer has an MFR from 0.3 to 30. In an alternative embodiment, the thermoplastic polymer has an MFR from 0.5 to 10.

In one embodiment, the thermoplastic polymer is a propylene/ethylene copolymer comprising from 0.1 to 3.4 wt % ethylene, based on the total weight of the propylene/ethylene copolymer. All individual values and subranges from 0.1 to 3.4 wt % are disclosed herein and included herein; for example the ethylene content may have a lower limit of 0.1, 0.5, 1, 1.5, 2, 2.5 or 3 wt % to an upper limit of 0.5, 1, 1.5, 2, 2.5, 3 or 3.4 wt %. For example, the amount of ethylene in the propylene/ethylene copolymer may range from 0.1 to 3.4 wt %; or in the alternative, from 0.5 to 3 wt %; or in the alternative, from 1 to 2.8 wt %; or in the alternative, from 1.5 to 2.5 wt %.

In one embodiment, the thermoplastic polymer has a melting point (Tm), as determined by DSC greater than 140° C. All individual values and subranges from greater than from 140° C. are included herein and disclosed herein; for example, the melting point of the thermoplastic polymer may be from a lower limit of 140, 150, or 160° C. In one embodiment, the thermoplastic polymer has a melting point from 140° C. to 165° C. In an alternative embodiment, the thermoplastic polymer has a melting point (Tm), as determined by DSC from 150 to 165° C. In yet another embodiment, the thermoplastic polymer has a melting point (Tm), as determined by DSC from 160 to 165° C.

In one embodiment, the thermoplastic polymer has a weight average molecular weight (Mw) within the range from 10,000 g/mol to 5,000,000 g/mol. All individual values and subranges are disclosed herein and included herein; for example, the Mw of the thermoplastic polymer may be from a lower limit of 10,000; 20,000; 30,000; 40,000, or 50,000 g/mol to an upper limit of 5,000,000; 2,500,000; 2,000,000; 1,500,000; 1,000,000 or 500,000 g/mol.

In one embodiment, the thermoplastic polymer is a polypropylene homopolymer that has a molecular weight distribution Mw/Mn (MWD(conv)), sometimes referred to as a "polydispersity index" (PDI), within the range having an upper limit of 8, or 6, or 4, or 3, and a lower limit of 2, or 2.2, or 2.4, or 2.6.

In one embodiment, the thermoplastic polymer is a propylene/α-olefin copolymer. Some α-olefins useful in the propylene/α-olefin copolymers may be selected, in certain embodiments, from the group of $C_3$-$C_{20}$ α-olefins. Preferred α-olefins for use in certain embodiments of the invention are designated by the formula $CH_2CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. In one embodiment, the thermoplastic polymer is a propylene/ethylene copolymer.

In one embodiment, the propylene/ethylene copolymer comprises greater than, or equal to, 90 wt %, or greater than, or equal to, 92 wt %, or greater than, or equal to, 94 wt %, or greater than, or equal to, 96 wt %, or greater than, or equal to, 98 wt %, of polymerized propylene, based on the weight of the copolymer. In one embodiment, the propylene/ethylene copolymer comprises less than, or equal to, 10 wt %, or less than, or equal to, 8 wt %, or less than, or equal to, 6 wt %, or less than, or equal to, 4 wt %, or less than, or equal to, 2 wt %, of polymerized ethylene, based on the weight of the copolymer.

In one embodiment, the propylene/ethylene copolymer has a melting point (Tm), as determined by DSC, greater than, or equal to, 125° C., or greater than, or equal to, 130° C., greater than, or equal to, 135° C., or greater than, or equal to, 140° C. In one embodiment, the propylene/ethylene copolymer has a heat of fusion (ΔHf), as determined by DSC, greater than, or equal to, 75 J/g, or greater than, or equal to, 80 J/g, or greater than, or equal to, 85 J/g. In one embodiment, the propylene/ethylene copolymer has a weight average molecular weight (Mw) within the range having an upper limit of 5,000,000 g/mol, or 1,000,000 g/mol, or 500,000 g/mol, and a lower limit of 10,000 g/mol, or 30,000 g/mol, or 50,000 g/mol.

In one embodiment, the propylene/ethylene copolymer has a molecular weight distribution Mw/Mn (MWD), sometimes referred to as a "polydispersity index" (PDI), within the range having an upper limit of 40, 30, 20, or 10, and a lower limit of 2, 3, 4, or 5.

The polypropylene homopolymer may be formed by the homopolymerization of propylene in a single stage or multiple stage reactors. The propylene/ethylene copolymer may be formed by copolymerizing propylene and ethylene in a single stage or multiple stage reactors.

Examples of useful polypropylene homopolymer and propylene/ethylene copolymer include PP534-1 (available from ExxonMobil Corp.), PROFAX 6823 (available from LyondellBasell, Inc.), and Aristech D008M (available from Aristech Corp) and HF 136MO (available from Borealis A G) and F008F (available from Sunoco, Inc.). A propylene-based polymer may comprise a combination of two or more embodiments as described herein. A polypropylene homopolymer may comprise a combination of two or more embodiments as described herein. A propylene/α-olefin copolymer may comprise a combination of two or more embodiments as described herein. A propylene/ethylene copolymer may comprise a combination of two or more embodiments as described herein.

In one embodiment, the thermoplastic polymer has a melt temperature (Tm) from 40 to 350° C. All individual values and subranges from 40 to 350° C. are included herein and disclosed herein; for example, the melt temperature may range from a lower limit of 40, 80, 120, 150, 180, 210, 240, 270, 300, or 330° C. to an upper limit of 80, 120, 150, 180, 210, 240, 270, 300, 330, or 350° C. For example the melt temperature of the thermoplastic polymer may range from 60 to 220° C.; or in the alternative, from 90 to 175° C.

In one embodiment, the thermoplastic polymer is an ethylene-based polymer. Suitable ethylene-based polymers which may be used as the thermoplastic polymer include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers). Some commercial examples of suitable ethylene-base interpolymers include commercially available HDPE, commercially available LDPE, ATTANE, AFFINITY, DOWLEX, FLEXOMER, ELITE, all available from The Dow Chemical Company; and EXCEED and EXACT available from ExxonMobil Chemical Company. In one embodiment, the thermoplastic polymer is an olefin multi-block interpolymer or copolymer. The olefin multi-block interpolymers and copolymers and their preparation and use, are described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983; each publication is fully incorporated herein by reference.

The thermoplastic polymers also include vinyl acetate, acrylonitrile, vinyl acetate, chlorinated and sulfonated polyethylenes and copolymers; polyvinyl chlorides and their related copolymers, acetal polymers and their related copolymers; fluorinated olefin polymers; polyvinylidene fluoride; polyvinyl fluoride; polyamides; polyimides; polyarylates; polycarbonates and their related copolymers; polyethers; polyethersulfones; polyarylsulphones; polyketones; polyetherimides; poly(4-methyl-1-pentene); polyphenylenes; polysulphones; polyurethanes; polyesters; polystyrene and their related copolymers; polybutylene; polymers of acrylo-nitrile, polyacrylates and polymethacrylates.

A thermoplastic polymer may comprise a combination of two or more embodiments as described herein.

Exemplary Oils Useful in the Inventive Composition:

In some embodiments of the invention, the inventive composition further comprises an oil. Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

In one embodiment, the oil is present in an amount from 20 to 200 PHR, based on the weight of the first composition. All individual values and subranges from 20 to 200 PHR are included herein and disclosed herein; for example, the oil may be present from a lower limit of 20, 50, 70, 90, 110, 130 150, 170 or 190 PHR to an upper limit of 50, 70, 90, 110, 130, 140, 160, 180 or 200 PHR. For example, the oil may be present in an amount from 20 to 200 PHR; or in the alternative, from 20 to 170 PHR; or in the alternative, from 70 to 150 PHR; or in the alternative, from 90 to 130 PHR. In one embodiment, the oil is present in an amount from 70 to 150 PHR, based on the weight of the first composition. In an alternative embodiment, the oil is present in an amount from 20 to 170 PHR, based on the weight of the first composition. In one embodiment, the oil is selected from the group consisting of nonaromatic oils, paraffinic oils, naphthenic oils, and combinations thereof. An oil may comprise a combination of two or more embodiments as described herein.

Exemplary Vulcanization Agents Useful in the Inventive Composition:

The inventive composition further comprises a vulcanization agent. Any cross-linking agent which is capable of curing an elastomer without substantially degrading and/or curing the thermoplastic polymer can be used in embodiments of the invention. A preferred cross-linking agent is phenolic resin because phenolic resin cure systems provide better balance of properties over other cure systems. Other curing agents include, but are not limited to, peroxides, azides, poly(sulfonyl azide), aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seem, Vol. 1, Wiley-Interscience, 1970), which are incorporated by reference herein in their entirety. Unless stated otherwise, the cure systems described below require an elastomer containing a conjugated or non-conjugated diene.

Any phenolic curative system which can cure EPDM rubber (EPDM composition) is suitable. While it is preferred to fully cure the elastomer, it is not always necessary. In some embodiments, the elastomer is partially cured or substantially cured. A basic ingredient of such system is a phenolic curing resin made by condensation of halogen substituted phenol, $C_1$-$C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5$-$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840, which are incorporated by reference herein in their entirety. Another suitable class of phenolic curative system is disclosed in U.S. Pat. No. 595,242, which is incorporated by reference herein in its entirety. Non-halogenated phenol curing resins are used in conjunction with halogen donors, preferably, along with a hydrogen halide scavenger. Ordinarily, halogenated, preferably brominated, phenolic resins containing from about 2 to about 10 weight percent bromine, do not require a halogen donor, but are used in conjunction with a hydrogen halide scavenger such as metal oxides such as iron oxide, titanium oxide, magnesium oxide, magnesium silicate, silicon dioxide and preferably zinc oxide, the presence of which promotes the cross-linking function of the phenolic resin; however, with rubbers which do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosures of which are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

Of course, it is understood that enough of phenolic curative is preferably used to fully cure the rubber. The minimum quantity of phenolic curative necessary to cure the rubber varies depending upon the type of rubber, phenolic curing agent, type of cure promoter, and curing conditions such as temperature. Typically, the quantity of phenolic curing agent used to fully cure the EPDM rubber is from about 2 parts to about 10 parts by weight phenolic curing agent per 100 parts by weight of the first composition. Preferably, the quantity of phenolic curing agent is from about 7 parts to about 14 parts by weight phenolic curing agent per 100 parts by weight of the first composition. In addition, an appropriate quantity of cure activator is used to assure full cure of the rubber. Satisfactory amounts of cure activator varies from about 0.01 parts by weight to about 10 parts by weight per 100 parts by weight of the first composition, although, higher amounts may be used, if desired and satisfactory cure is obtained. The term "phenolic curative" includes a phenolic curing agent (resin) and a cure activator.

Generally, the thermoplastic elastomers in the inventive compositions are fully cured. Such fully cured vulcanizates are processable as thermoplastics although they are cross-linked to a point where the rubber portions are almost entirely insoluble in the usual solvents. Where the determination of extractables is an appropriate measure of the state of cure, the thermoplastic vulcanizates are produced by vulcanizing the inventive compositions to the extent that the vulcanizate contains no more than about three percent by weight of rubber extractable in cyclohexane at 23° C. and preferably to the extent that the vulcanizate contains less than two percent by weight extractable in cyclohexane at 23° C. In general, the less extractables the better are the properties and still more preferable are vulcanizates having essentially no extractable rubber (less than 0.5 weight percent) in cyclohexane at 23° C. Gel content reported as percent gel is determined by the procedure of U.S. Pat. No. 3,203,937 which comprises determining the amount of insoluble polymer by soaking the specimen for 48 hours in cyclohexane at 23° C. and weighing the dried residue, making suitable corrections based upon knowledge of the composition. Thus, corrected initial and final weights are used by subtracting from the initial weight the weight of the components soluble in cyclohexane, other than the rubber, such as extender oils, plasticizers and components of the resin soluble in cyclohexane. Any insoluble pigments or fillers are subtracted from both the initial and final weights.

A vulcanization agent may comprise a combination of two or more embodiments as described herein. In one embodiment, the inventive composition can be pelletized. An inventive composition may comprise a combination of two or more embodiments as described herein.

Process of Making TPV:

As is well known in the art, the thermoplastic vulcanizates based on the first composition are preferably prepared by utilizing dynamic vulcanization techniques. Dynamic vulcanization is a process whereby a blend of plastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during the vulcanization step. One advantage of dynamic vulcanization is that elastoplastic (thermoplastic elastomeric) compositions may be obtained when the crosslinked rubber is well dispersed in the thermoplastic matrix. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,049 4,287,324; 4,288,570; 4,299,931; 4,311,628 and 4,338,413 and are hereby incorporated by reference in their entirety.

A variety of mixing equipment can be employed to prepare TPV by dynamic vulcanization process. Illustrative mixing equipment include: batch mixers, such as BRABENDER mixers, BANBURY mixers, continuous mixers such as FARRELL continuous mixers, and extruders with one or more screws such as COPERION ZSK 53. One or more such mixing equipment, including extruders, can be used in series. The thermoplastic, rubber and curatives can be added to a heated mixer as individual feed streams, as a dry blend or as a masterbatch. When an extruder is used to prepare the TPV, if additional oil is needed, the oil is preferably added from a port provided in the melt mixing device using a gear pump or the like. Moreover, additional additives or materials, including other resins and elastomers, may be added by a side feeder on the melt mixing device or the like.

Suitable curing temperatures for the TPV are well known to one skilled in the art. Suitable curing temperatures depend on the thermoplastic polymer and vulcanizing agent and/or activator but typically the range is from 80° C. to 300° C. For example, when polypropylene homopolymer is used as the thermoplastic polymer and the curative is a phenolic resin, a curing temperature of 170° C. to 270° C. is preferred, with 190° C. to 250° C. being more preferred. Heating and masticating at these vulcanization temperatures are generally adequate to complete the vulcanization reaction in a few minutes or less, but if shorter vulcanization times are desired, higher temperatures may be used. The desired dispersion of discrete crosslinked rubber particles and end properties can be achieved through choice of screw design and screw speed. The progress of the vulcanization may be followed by monitoring melt temperature or mixing energy or mixing torque requirement during the process. If desired, one can add additional ingredients, such as a stabilizer package, processing aid, oil, plasticizer, or additional thermoplastic polymer after the dynamic vulcanization is complete.

In some embodiments of the invention, the TPV is made using a one step or two or more step compounding process. In one-step compounding using phenolic curatives, the compounding temperature preferably is maintained below 220° C. to avoid breaking down the phenolic curative agent. In two-step compounding, when the vulcanizing agent does not require a cure activator, the TPV premix will not contain any vulcanizing agent. If the vulcanizing agent requires a cure activator, the cure activator can be added to the TPV premix and the curative agent is typically added during the second step and the temperature during the second step is maintained below 220° C. After discharge from the mixing device, the TPV can be milled, chopped, extruded, pelletized, injection molded, or processed by any other desirable technique.

Other Additives:

In some embodiments, the inventive composition may comprise one or more additional additives. Suitable additives include, but are not limited to, fillers, antioxidants, UV stabilizers, foaming agents, flame retardants, colorants or pigments, and combinations thereof. In one embodiment, the composition comprises at least one additive selected from fillers, antioxidants, UV stabilizers, foaming agents, or combinations thereof.

Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly($\alpha$-methyl)-styrene resins, natural fibers, synthetic fibers, and the like. In one embodiment, the filler is carbon black.

Antioxidants and antiozonants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octyl-thio)1,3,5-triazine, hexahydro-1,3,5-tris-$\beta$-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

In one embodiment, an inventive composition further comprises at least one foaming agent. Foaming agents useful in making the resulting foam structure include, but are not limited to, decomposable chemical foaming agents. Such chemical foaming agents decompose at elevated temperatures to form gases or vapors to blow the polymer into foam form. The agent preferably takes a solid form, so it is conveniently dry-blended with the polymer material. Chemical blowing agents include, but are not limited to, azodicarbonamide, azodiisobutyro-nitrile, barium azodicarboxylate, N,N'-dimethyl-N,N'-dinitrosoterephthalamide, N,N'-dinitrosopentamethylenetetramine, benzenesulfonhydrazide, 4,4-oxybenzene sulfonyl semicarbazide, p-toluene sulfonyl semicarbazide, p,p'-oxybis-(benzenesulfonyl hydrazide), 3,3'-disulfonhydrazide-diphenylsulfone, azobi-sisobutyronitrile, azobisformamide and the like. In one embodiment, the blowing agent is azodicarbonamide. These foaming agents may be used alone or in admixture of two or more. In one embodiment, the foaming agent is an inorganic foaming agent, such as ammonium carbonate, sodium bicarbonate, anhydrous sodium nitrate and the like.

Inventive Articles:

The invention also provides an article comprising at least one component formed from an inventive composition. Articles include, but are not limited to, foams, weather strips, belts, hoses, wire and cable jacketing, tubes, flooring materials, gaskets, membranes, molded goods, extruded parts, and adhesives (for example, high viscosity adhesives). Additional articles includes polymer sheets, automotive parts (for example, tires and tire components), computer parts, building materials, household appliances, electrical supply housings, trash cans, garden hose, refrigerator gaskets, acoustic systems, utility cart parts, desk edging, and toys. The compositions can also be used in roofing applications, such as roofing membranes. The compositions can further be used in fabricating a footwear component, including, but not limited to, a shaft for a boot, particularly an industrial work boot. The compositions can also be used in fabricating automotive parts. A skilled artisan can readily augment this list without undue experimentation. Illustrative processes include, but are not limited to, extrusion, calendering, injection molding, compression molding, and other typical thermoplastic processes. For example, articles can be prepared by injection molding, extrusion, extrusion followed by thermoforming, low pressure molding, compression molding, and the like. The invention also provides an article comprising at least one component formed from an inventive composition. In a further embodiment, the article is a foamed profile extruded article. In a further preferred embodiment, the article is a weather-strip. In another embodiment, the article is an automotive part. In another embodiment, the article is a hose. In another embodiment, the article is a flooring material. In another embodiment, the article is a thermoplastic vulcanizate (TPV). In another embodiment, the article is a footwear component, such a shoe inner sole or shoe outer sole.

The invention also provides a foam formed from an inventive composition. The invention also provides an article comprising at least one component formed from a foam formed from an inventive composition. In a further embodiment, the article is a weather-strip.

In one embodiment, the inventive articles have a Shore A hardness of equal to, or greater than, 60. All individual values and ranges of equal to, or greater than, 60 are included herein and disclosed herein. For example the Shore A hardness of the inventive articles may be from a lower limit of 60, 65, 70, or 75. In one embodiment, the inventive articles have a Tensile Strength of equal to, or greater than, 750 psi. All individual values and ranges of equal to, or greater than, 750 psi are included herein and disclosed herein. For example the Tensile Strength of the inventive articles may be from a lower limit of 750, 800, 850, or 900 psi. In one embodiment, the inventive articles have an elongation of equal to, or greater than, 270%. All individual values and ranges of equal to, or greater than, 270% are included herein and disclosed herein. For example the elongation of the inventive articles may be from a lower limit of 270, 280, 290, 300, 310, 320 or 330%.

In one embodiment, the inventive articles have a compression set (70 hr@ −20° C.) from 12 to 25%. All individual values and subranges from 12 to 25% are included herein and disclosed herein; for example the compression set (70 hr@ −20° C.) may range from a lower limit of 12, 15,18, 22 or 24% to an upper limit of 13, 15, 17, 20, 22 or 24%. In one embodiment, the inventive articles have a compression set (22 hr@ 70° C.) from 34 to 42%. All individual values and subranges from 34 to 42% are included herein and disclosed herein; for example the compression set (22 hr@ 70° C.) may range from a lower limit of 34, 35, 36, 37, 38, 39, 40 or 41% to an upper limit of 35, 36, 37, 38, 39, 40, 41 or 42%. In one embodiment, the inventive articles have a compression set (70 hr@ 120° C.) from 50 to 65%. All individual values and subranges from 50 to 65% are included herein and disclosed herein; for example the compression set (70 hr@ 120° C.) may range from a lower limit of 50, 52, 54, 56, 58, 60, 62 or 64% to an upper limit of 54, 56, 58, 60, 62, 64 or 65%. In one embodiment, the inventive articles have an oil resistance of at least 112%. All individual values and subranges from a lower limit of 112% are included herein and disclosed herein; for example, the oil resistance of the inventive articles may be from a lower limit of 112%, 113%, or 114%. An inventive article may comprise a combination of two or more embodiments as described herein.

Definitions

The term "composition," as used herein, includes a mixture of materials, which comprise the composition, as well as reaction products and decomposition products formed from the materials of the composition. The term "polymer," as used herein, refers to a polymeric compound prepared by polymerizing monomers, whether of the same or a different type. The generic term polymer thus embraces the term homopolymer (employed to refer to polymers prepared from only one type of monomer with the understanding that trace amounts of impurities can be incorporated into the polymer structure), and the term interpolymer as defined hereinafter. The term "thermoplastic polymer," as used herein, refers to a polymer that can be repeatedly made molten (soft) and solidified (hard) through heating and cooling, respectively. The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers. The term, "ethylene-based polymer," as used herein, refers to a polymer that comprises, in polymerized form, a majority amount of ethylene monomer (based on the weight of the polymer), and optionally may comprise one or more comonomers. The term, "propylene-based polymer," as used herein, refers to a polymer that comprises, in polymerized form, a majority amount of propylene monomer (based on the weight of the polymer), and optionally may comprise one or more comonomers. The term, "propylene/ethylene copolymer," as used herein, refers to a copolymer that comprises, in polymerized form, a majority amount of propylene monomer (based on the weight of the copolymer), and ethylene, as the only two monomer types. The term, "propylene/α-olefin copolymer," as used herein, refers to a copolymer that comprises, in polymerized form, a majority amount of propylene monomer (based on the weight of the copolymer), and an α-olefin, as the only two monomer types. The phrase "thermally treating," as used herein, refers to the application of heat and/or radiation to a composition or material, to increase the temperature of the composition or material. The term "PHR" (either in uppercase or lowercase font), as used herein, is in reference to weight of a compositional component relative to hundred parts of the one or more ethylene/α-olefin/nonconjugated polyene interpolymers. The term "parts," in reference to an amount of a component, refers to the weight parts of a component in a composition. The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Mooney Viscosity Interpolymer (EPDM with no filler and no oil) Mooney Viscosity (ML1+4 at 125° C.) is measured in accordance with ASTM 1646-04, with a one minute preheat time and a four minute rotor operation time. The instrument is an Alpha Technologies Rheometer MDR 2000.

For dual reactor polymerizations in series, the Mooney viscosity of the second reactor component is determined by the following equation: log ML=n(A) log ML(A)+n(B) log ML(B); where ML is the Mooney viscosity of the final reactor product, ML(A) is the Mooney viscosity of the first reactor polymer, ML(B) is the Mooney viscosity of the second reactor polymer, n(A) is the weight fraction of the first reactor polymer, and n(B) is the weight fraction of the second reactor polymer. Each measured Mooney viscosity is measured as discussed above. The weight fraction of the second reactor polymer is determined as follows: n(B)=1−n(A), where n(A) is determined by the known mass of first polymer transferred to the second reactor.

Gel Permeation Chromatography (GPC):

Polymer molecular weight is characterized by high temperature, triple detector Gel Permeation Chromatography (3D-GPC). The chromatographic system consists of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector is used for calculation purposes.

Data collection is performed using VISCOTEK TriSEC software version 3 and a 4-channel VISCOTEK Data Manager DM400. The system is equipped with an on-line ERC-3415a four channel degasser system from ERC Inc (Tokyo, JP). The carousel compartment is operated at 150° C. for polyethylene and 85° C. for EPDM, and the column compartment is operated at 150° C. The columns are four Polymer Lab Mix-A 30 cm, 20 micron columns. The polymer solutions are prepared in 1,2,4-trichlorobenzene (TCB). The samples are prepared at a concentration of 0.1 grams of polymer in 50 ml of TCB. The chromatographic solvent and the sample preparation solvent contain 200 ppm of butylated hydroxytoluene (BHT). Both solvent sources are nitrogen purged. Polyethylene samples are stirred gently at 160° C. for four hours. EPDM samples are stirred gently at 160° C. for one hour. For carbon black containing samples, carbon black is removed by a "one-time filtration" that is performed at 150° C., under a nitrogen pressurized flow through a pre-heated layer of PERLITE in a ceramic filter. The injection volume is 200 μl, and the flow rate is 1.0 ml/minute.

Calibration of the GPC column set is performed with 21 narrow, molecular weight distribution polystyrene standards. The molecular weights of the standards range from 580 to 8,400,000, and are arranged in 6 "cocktail" mixtures, with at least a decade of separation between individual molecular weights.

The polystyrene standard peak molecular weights are converted to polyethylene molecular weights using the following equation (as described in Williams and Ward, J. Polym. Sci., Polym. Let., 6, 621 (1968)): Mpolyethylene=A×(Mpolystyrene)$^B$ (1A), where M is the molecular weight, A has a value of 0.39 and B is equal to 1.0. A fourth order polynomial is used to fit the respective polyethylene-equivalent calibration points.

The total plate count of the GPC column set is performed with EICOSANE (prepared at 0.04 g in 50 milliliters of TCB, and dissolved for 20 minutes with gentle agitation.) The plate count and symmetry are measured on a 200 microliter injection according to the following equations: PlateCount=5.54*(RV at Peak Maximum/(Peak width at ½ height)) ^2 (2A), where RV is the retention volume in milliliters, and the peak width is in milliliters. Symmetry= (Rear peak width at one tenth height−RV at Peak Maximum)/(RV at Peak Maximum−Front peak width at one tenth height) (3A), where RV is the retention volume in milliliters, and the peak width is in milliliters. The Systematic Approach for the determination of multi-detector offsets is done in a manner consistent with that published by Balke, Mourey, et. al (Mourey and Balke, Chromatography Polym. Chpt 12, (1992)) (Balke, Thitiratsakul, Lew, Cheung, Mourey, Chromatography Polym. Chpt 13, (1992)). Optimizing dual detector, log molecular weight results from a broad polyethylene of 115,000 to the narrow standard column calibration results, from the narrow standards calibration curve, is done using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, is obtained from the sample refractive index, increment area, and the RI detector calibration from a linear polyethylene homopolymer of 115,000 Dalton molecular weight. The refractive index increment (dn/dc) for polyethylene is −0.104 mL/g and dn/dc for EODM is −0.094 mL/g. The chromatographic concentrations are assumed low enough to eliminate addressing 2nd Virial coefficient effects (concentration effects on molecular weight).

The calculations of Mn, Mw, and Mz based on GPC (conventional (conv) GPC for Mn, Mw and Mz) results using the RI detector are determined from the following equations:

$$\overline{Mn} = \frac{\sum_i RI_i}{\sum_i (RI_i / M_{calibration_i})}, \quad (4A)$$

$$\overline{Mw} = \frac{\sum_i (RI_i * Mcal_i)}{\sum_i RI_i}, \quad (5A)$$

$$\overline{Mz} = \frac{\sum_i (RI_i * Mcal_i^2)}{\sum_i (RI_i * Mcal_i)}. \quad (6A)$$

Another form of molecular weight average is the viscosity average which can be calculated using Equation 7A:

$$\overline{Mz} = \left( \frac{\sum_i (RI_i * Mcal_i^{\alpha+1})}{\sum_i (RI_i)} \right)^{1/\alpha}, \quad (7A)$$

where α is a material dependent parameter which relates the intrinsic viscosity ([η]) to the molecular weight of the polymer.

In addition to the above calculations, a set of alternative values [Mw(abs), Mz(abs), Mz (BB) and MZ+1 (BB)] values are also calculated with the method proposed by Yau and Gillespie, Polymer, 42, 8947-8958 (2001), and determined from the following equations:

$$\overline{Mw}(abs) = K_{LS} * \frac{\sum_i (LS_i)}{\sum_i (IR_i)}, \quad (8A)$$

where, $K_{LS}$=LS-MW calibration constant, $$\overline{Mz}(abs) = \frac{\sum_i RI_i * (LS_i / RI_i)^2}{\sum_i RI_i * (LS_i / RI_i)}, \quad (9A)$$

$$\overline{Mz}(BB) = \frac{\sum_i (LS_i * Mcalibration_i)}{\sum_i (LS_i)}, \quad (10A)$$

$$\overline{M_{Z+1}}(BB) = \frac{\sum_i (LS_i * Mcalibration_i^2)}{\sum_i (LS_i * Mcalibration_i)}, \quad (11A)$$

where $LS_i$ is the 15 degree LS signal, and the Mcalibration uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker is therefore established based on the air peak in TCB, or a drop of decane flow marker dissolved in the eluting sample prepared in TCB. Flow rate marker is used to linearly correct the flow rate for all samples, by alignment of the air peaks or decane peaks. Any changes in the time of the marker peak are then assumed to be related to a linear shift in both flow rate and chromatographic slope.

The plate count for the chromatographic system (based on EICOSANE as discussed previously) should be greater than 22,000, and symmetry should be between 1.00 and 1.12.

Method for Determination of Non-Conjugated Polyenes in an Ethylene/α-Olefin/Polyene Interpolymer by NMR The ethylene and non-conjugated polyene contents of an interpolymer comprising ethylene, an α-olefin and a non-conjugated polyene can be determined by 13C or 1H Nuclear Magnetic Resonance (NMR) spectroscopy. For example, the 1H NMR spectra can be obtained via a Varian XL-400 NMR spectrometer, operating in Fourier Transform mode, with the following instrument conditions: pulse angle, 40°; acquisition time, 0.7 sec; pulse delay, 5.0 sec; spectral width, 12,000 Hz, and number of transient accumulated, 200.

Samples are dissolved in deuterated chloroform, at room temperature, at a concentration of 1-2 weight percent, based on the total weight of the solution. For the determination of the ethylene content, the integrals of the methyl region (chemical shift delta versus tetramethysilane=0.88 ppm to 0.94 ppm) and the methylene region and methine region (delta=1.10 ppm to 1.54 ppm) can be employed. Similarly, if the α-olefin is propylene, the propylene content can also be determined from the resolved methyl spectral peak.

The non-conjugated polyene content can be determined from the integral of the peak for the olefinic protons occurring at around 5 ppm, and the methylene, methyl and methine regions are corrected for the presence of the non-conjugated polyene units incorporated in the polymer. For example, when the diene is ENB, the diene content is determined from the integral of the peak for olefinic protons occurring at about 5.28 and 5.02 ppm (for cis- and transmethine protons of =CH—CH3, respectively), and the methylene, methyl and methine regions are corrected for the presence of incorporated ENB. If the non-conjugated polyene is another kind, characteristic NMR spectral shift(s) can be resolved, and the integral of the chemical shift regions can be obtained. In addition, unincorporated non-conjugated polyene, if present, can be distinguished by the presence of vinyl protons. In this way, the proton analysis is capable of yielding unambiguous values for the contents of ethylene, α-olefin, such as propylene, and diene incorporated in the polymer.

Similarly, the content of the non-conjugated polyene an interpolymer comprising ethylene, an α-olefin and a non-conjugated polyene can also be determined using 13C NMR and other spectroscopic methods.

Additional spectroscopic methods are described in the following references, each fully incorporated herein by reference:
1. Yasuyuki Tanaka, Hisaya Sato, Yukio Ozeki, Masaru Ikeyama and Takefumi Sato, "Determination of unsaturation in ethylene-propylene terpolymers and butyl rubber by time-averaged 1 H n.m.r. measurements", Polymer, 16(10)(1975), 709-713. 2. U.S. Pat. No. 5,229,478, "Process for production of high molecular weight EPDM elastomers using a metallocene-alumoxane catalyst system", Jul. 20, 1993). 3. W. Heinena, L. N. Ballijnsa, W. J. A. Wittenburga, R. Wintersa, J. Lugtenburga, M. van Duinb, "Synthesis and characterization of carbon-13 labelled 2-ethylidene-5-norbornene containing EPDM rubber. Observation of crosslinking and oxidation", Polymer 40 (1999) 4353-4363. 4. Harry J. A. Philipsen, "Determination of chemical composition distributions in synthetic polymers", Journal of Chromatography A, 1037 (2004) 329-350. 5. S. DiMartino and M. Kelchtermans, Determination of the composition of ethylene-propylene-rubbers using 13C-NMR spectroscopy, J. Appl. Poly. Sci. 56(13) (2003) 1781-1787. 6. Hayashi, T., Inoue, Y., Chujo, R., "Ethylene-Propylene Copolymerization Mechanism Based on the Sequence Distributions Determined by 13C NMR Spectra", Macromolecules 21 (1988) 3139-3146.

Method for Determination of Weight Percentage of ENB in an Ethylene/Propylene/ENB (EPDM) Terpolymer Using FTIR:

The weight percentage of 5-ethylidenenorbornene (ENB) can be determined using a Fourier Transform Infrared Spectroscopic (FTIR) method (for example, ASTM D65047-99). According to this ASTM D65047-99 method, the ENB content is determined from its infrared absorbance at 1681-1690 cm$^{-1}$, a measure of the ENB's exocyclic double bond. For EPDM catalyzed with a single site catalyst, the infrared absorbance band at about 1688 cm$^{-1}$ can be used. The absorbance of the EPDM interpolymer at 1688 cm$^{-1}$ is related to ENB mass fraction, and the mass fraction is determined by calibrating the instrument with known EPDM standards. The presence of oil and other components are first removed, such as by extraction, before the FTIR analysis. For oil-extended polymers, the oil can be removed using ASTM Method D 1416, section 67 through 74, and ASTM Method D 297. The FTIR spectra are collected with 32 scans, at a resolution of 2 cm$^{-1}$. The spectra for the dry empty specimen compartment (Po) were first collected. The test sample is placed in the specimen compartment, and the dry atmosphere is re-established inside the specimen compartment. The single beam spectra (P) are collected, and the specimen absorbance (A) is calculated according to the following equation: A=−log 10(P/Po). The calibration may be made using known standards covering the desired weight percent diene range, typically from 0 to 10 weight percent. The calibration may be based on primary standards for which the weight percent of ENB may be established via the use of primary methods, such as Nuclear Magnetic Resonance (NMR) methods. The FTIR test specimen are prepared by pressing 0.20+/−0.05 grams of the polymer sample, placed between two Mylar sheets, using a platen press, heated at 125° C.+/−5° C., and a 4 MPa pressure, for 60+/−10 seconds. The pressed sheet is cooled to ambient temperature. A piece of the pressed film is cut into "15 mm by 50 mm" sized sample, and placed into the FTIR spectrophotometer sample holder window for spectral acquisition. Additional spectroscopic methods are described in the following references, each fully incorporated herein by reference. 1. ASTM D 6047-99, "Standard Test Methods for Rubber, Raw-Determination of 5-Ethylidenenorbornene (ENB) or Dicyclopentadiene (DCPD) in Ethylene-Propylene-Diene (EPDM) Terpolymers", Annual Book of ASTM Standards, 1999 Issue. 2. J. M. Winter, M. S. Edmondson, D.

R. Parikh, D. J. Mangold, and M. J. Castille, Jr. "Thermal and Spectroscopic (Vibrational and Nuclear Magnetic Resonance) Characterization of Ethylene-Propylene-Diene (EPDM) Elastomers", Presented at 152nd Fall Technical Meeting, Rubber Division, American Chemical Society, Cleveland, Ohio, Oct. 21-24, 1997. Paper No. 40. 3. S. DiMartino and M. Kelchtermans, Determination of the composition of ethylene-propylene-rubbers using 13C-NMR spectroscopy, J. Appl. Poly. Sci. 2003, 56 (13), 1781-1787. 4. Hayashi, T., Inoue, Y., Chujo, R., "Ethylene-Propylene Copolymerization Mechanism Based on the Sequence Distributions Determined by 13C NMR Spectra", Macromolecules 1988, 21, 3139-3146. 5. Ray, G. J., Johnson, P. E., Knox, J. R., "Carbon-13 Nuclear Magnetic Resonance Determination of Monomer Composition and Sequence Distributions in Ethylene-Propylene Copolymers Prepared with a Stereoregular Catalyst System', Macromolecules 1977, 10, 773-778.

Compression Set:

Compression set was measured according to ASTM D 395 at −20° C., 70° C. and 120° C. Disks of 29.mm (±0.5 mm) in diameter and about 3 mm in thickness were punched from the injection molded plaques, prepared as described under the section on Injection Molding below. For each sample, four disks were inspected for notches, uneven thickness and inhomogeneity, and selected disks (without those defects) were stacked such that the total height was 12.5 mm (±0.5 mm) Compression set was performed on two specimens for each sample at the three temperatures and the average of the two specimen measurements reported. The stacked disks were placed in the compressive device having two metal plates that can be pressed together and locked into place at 75% of the original height of the stacked disks. The compressive device with the compressed samples was then placed in an oven and equilibrated at the appropriate temperature for a specified time (22 hrs for 70° C., 72 hrs for 120° C.). For the −20° C. testing, the compressive device with the compressed samples were placed in a freezer and equilibrated at the appropriate temperature for a specified time (22 hrs for −20° C.). In this test, the stress was released at the test temperature, and the thickness of the sample was measured after a 30 minute equilibration period at room temperature. Compression set is a measure of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Stress-Strain Properties:

Tensile properties were measured using specimens which were die cut using a small dog bone shaped micro tensile die, having the dimensions described in ASTM D-1708. The die cut specimens were cut from injection molded plaques which were prepared as described under the Injection Molding section below. Tensile properties (tensile strength and elongation) were measured at room temperature following the method of ASTM D-412 in the machine direction on an INSTRON Model 1122, made by INSTRU-MET Corporation.

Shore A Hardness:

Sample specimens were cut from injection molded plaques which were prepared as described in the Injection Molding section below. Sample size was 29 mm in diameter (±0.5 mm) and about 3 mm thick. Shore A hardness was measured per ASTM D2240 on a Shore A DUROMETER Model 2000 made by INSTRON with a DUROMETER Stand Model 902. This test method permits hardness measurements based on either initial indentation or indentation after a specified period of time, or both. As used herein, the indentation was measured at a specified time of 10 seconds.

DSC Standard Method:

Differential Scanning calorimetry results were determined using a TAI model Q1000 DSC equipped with an RCS cooling accessory and an autosampler. A nitrogen purge gas flow of 50 ml/min was used. The sample was pressed into a thin film and melted in the press at about 175° C. and then air-cooled to room temperature (25° C.). From 3 to 10 mg of material was then cut into a 6 mm diameter disk, accurately weighed, placed in a light aluminum pan (about 50 mg), and then crimped shut. The thermal behavior of the sample was investigated as follows. The sample was rapidly heated to 180° C. and held isothermal for 3 minutes in order to remove any previous thermal history. The sample was then cooled to −40° C. at 10° C./min cooling rate and held at −40° C. for 3 minutes. The sample was then heated to 150° C. at 10° C./min. heating rate. The cooling and second heating curves were recorded. The DSC melting peak was measured as the maximum in heat flow rate (W/g) with respect to the linear baseline drawn between −30° C. and end of melting. The heat of fusion was measured as the area under the melting curve between −30° C. and the end of melting using a linear baseline.

Oil Resistance:

Sample specimens were die cut from injection molded plaques, which were made as described in the Injection Molding section below, into tensile bars of 3.81 cm. by 2.22 cm by 0.318 cm (1.5 inch by 0.875 inch by 0.125 inch). Oil resistance was measured in accordance with ASTM 471-98 in which the sample was immersed in oil, specifically IRM-903 (R. E. Carrol Inc.) at 125° C. The oil resistance was calculated as the percent change in volume following immersion in oil according to the following equation:

$$V=[(M3-M4)/(M1-M2)]^{-1},$$

where: V=change in volume, %, M1=initial mass of specimen in air, M2=initial mass of specimen in water, M3=mass of specimen in air after immersion, and M4=mass of specimen in water after immersion and M1-M4 are measured in grams.

Dynamic Mechanical Spectroscopy:

Rheology was measured using Dynamic Mechanical Spectroscopy (DMS). DMS experiments were conducted at 190° C. on a Rheometrics ARES equipped with 25 mm parallel plates. Sample disks (25 mm in diameter and about 3 mm in thickness) were cut from the injection molded plaques which were prepared as described in the Injection Molding section below. The DMS testing was conducted under a nitrogen atmosphere. The frequency was varied between 0.1 and 100 rad/s. The strain amplitude was adjusted based upon the response of the samples between 4 and 10%. Viscosity readings were calculated by the Rheometrics ARES software. Rheology ratio (RR) was calculated as the ratio of the complex viscosity at 0.1 rad/s to complex viscosity at 100 rad/s. The tan δ which is a ratio of the loss modulus (G") to the storage modulus (G') was characterized at 0.1 rad/s.

$^{13}$CNMR Analysis for Ethylene Content:

The samples (the EPDM component) were prepared by adding approximately 3 g of a 50/50 mixture of tetrachloroethane-d 2/orthodichlorobenzene to 0.4 g sample in a 10 mm NMR tube. The samples were dissolved and homogenized by heating the tube and its contents to 150° C. The data were collected using a JEOL ECLIPSE™ 400 MHz spectrometer or a Varian Unity PLUS™ 400 MHz spectrometer, corresponding to a 13C resonance frequency of 100.5 MHz. The data were acquired using 4000 transients per data file with a 6 second pulse repetition delay. To achieve minimum signal-to-noise for quantitative analysis, multiple data files were added together. The spectral width was 25,000 Hz with a minimum file size of 32K data points. The samples were analyzed at 130° C. in a 10 mm broad band probe. The comonomer incorporation was determined using Randall's triad method (Randall, J. C; JMS-Rev. Macromol. Chem. Phys., C29, 201-317 (1989), which is incorporated by reference herein in its entirety.

Injection Molding:

Crosslinked pellets were injection molded using an Arburg 370C Allrounder 80 ton injection molder. The test plaques were 4×6×0.125 inch in dimension. The injection molding conditions were as follows: (1) Barrel and Mold Temperatures—Zone 1 Temp. T801=250° F.; Zone 2 Temp. T802=350° F.; Zone 3 Temp. T803=400° F.; Zone 4 Temp. T804=400° F.; Nozzle Temp. T805=400° F.; and Mold Temperature=65° F.; (2) Extruder-RPM v401=20 m/min; Backpressure p401=15 Bar; Dosage V403=70 ccm; and Real Dosage V403=72 ccm; (3) Optimal Injection—Injection Speed #1 Q301=25 ccm/s; Transfer Position V311=25 ccm; Fill Time t305 m=~2.37 s.; Cushion V3211=~7.3 ccm; (4) Hold Pressure #1 p321=~325 Bar depending on material viscosity; (5) Hold Time #1 t321—30 s.; Cool Time t400=20 s.; Dosage (recovery) Time t402m=7.5 s; and Cycle Time t902=59.3 s. About twelve test plaques were prepared for each crosslinked compositions of Inventive Example 1 and Comparative Examples 1 and 2.

EXAMPLES

The following examples illustrate, but do not, either explicitly or by implication, limit the present invention. Inventive Example 1: Table 1 provides the identity and source of materials used in preparing the Inventive and Comparative Examples.

TABLE 1

| Material | Description | Supplier |
| --- | --- | --- |
| First Composition | See Table 3 | The Dow Chemical Company |
| VISTALON 3666 | Oil extended EPDM | ExxonMobil Chemical Company |
| PP (H110-02N) | Polypropylene homopolymer, 2MFR | The Dow Chemical Company |
| PARALUX 6001 | Paraffinic process oil | Sunoco, Inc. |
| SP 1045 | phenolic resin crosslink agent | Schenectaday Int'l |
| Stannous Chloride (dihydrate) | curing catalyst | Mason Corporation |
| KADOX 911 | zinc oxide | Zinc Corporation of America |
| BURGESS ICECAP K | kaolin clay | Burgess Pigment Company |

Table 2 provides the formulation of Inventive Example 1, given in both PHR and weight percent units. Comparative Example 1 is SANTOPRENE 201-64, a polyolefin based thermoplastic vulcanizate (TPV) in the thermoplastic elastomer (TPE) family, is available from ExxonMobil Chemical Company. Comparative Example 2 is a TPV made with VISTALON 3666, an oil extended ethylene propylene diene terpolymer with 75 PHR oil. VISTALON 3666 has a Mooney viscosity of about 250 ML (1+4@125° C.), in the absence of extender oil (as reported in U.S. Patent Publication No. 2008/00330891). VISTALON 3666 further comprises 4.5 wt % ENB and 64 wt % ethylene, and is available from ExxonMobil Chemical Company.

Compounding Process:

The formulation in Table 2 was used for Inventive Example 1. A two step compounding process was used to prepare the Inventive Composition.

First Step: Preparing the Precrosslinked (Precompounded) Composition—

The formulation components in PHR for the TPV preblend is listed in Table 2. The following components were blended (dry mixed): first composition; polypropylene; K filler; stannous chloride, and zinc oxide, to form a preblend. The preblend was added to a 30 mm twin-screw extruder with a total length-to-diameter ratio (L/D) of 28. The preblend was fed using a K-TRON SODER K2LS60 Loss-In-Weight Feeder. The oil was fed continuously to ports 1 and 2 of the extruder using separate gear pumps. The precrosslinked composition was pelletized using an underwater pelletization unit with a 1 hole die. Second step: dynamic vulcanization of the precrosslinked (precompounded) composition—50 PHR oil and 5 PHR phenolic resin were added during the second step. The second step compounding was performed on a 25-mm co-rotating twin screw extruder. The extruder consisted of twelve barrel sections, resulting in a total length-to-diameter ratio (L/D) of 49. The extruder was equipped with a 24 kW motor and a maximum screw speed of 1200 rpm. The feed system for this extrusion line consisted of two loss-in-weight feeders. The precrosslinked composition was fed into the main feed throat of the extruder using a K-Tron KCLQX3 single-screw feeder.

The liquid process oil and phenolic resin were added through an injection port at barrel 2. Before injection, phenolic resin was dissolved in heated process oil at 120° C. and the solution was then added to the extruder using a Leistritz Gear Pump cart with heat traced liquid feed systems. The crosslinked (compounded) composition exiting the extruder is then pelletized using an underwater pelletization unit.

Preparation of Comparative Example 2:

The foregoing description of step 2 (the compounding step) was also used in preparing the crosslinked composition of Comparative Example 2. However, the precrosslinked (precompounded) composition for Comparative Example 2 was prepared as follows. The VISTALON 3666 was obtained in bale form and then manually cut into smaller chunks. The VISTALON 3666 chunks, the polypropylene, the K filler, the oil, stannous chloride, and zinc oxide were added to a Branbury mixer (28 pounds per batch) at a temperature of 175° C. The resulting precrosslinked (precompounded) composition was then passed through a single screw extruder and then pelletized using an underwater pelletization unit. The extruder had a tapered 20.32 cm. by 11.43 cm. (8 inch×4.5 inch) screw. The overall length/diameter ratio (L/D) was 14.1/1. L/D for the 11.43 cm. (4.5 inch) diameter metering section was 8.1/1.

Comparative Example 1 (SANTOPRENE 201-64) was obtained in pellet form.

TABLE 2

| Formulation | Wt % | PHR | Ingredients added during first step (PHR) | Ingredients added during second step (PHR) |
| --- | --- | --- | --- | --- |
| (EPDM) First Composition (See Table 3) | 29.56 | 100 | 100 | 0 |

TABLE 2-continued

| Formulation | Wt % | PHR | Ingredients added during first step (PHR) | Ingredients added during second step (PHR) |
|---|---|---|---|---|
| Polypropylene | 17.15 | 58 | 58 | 0 |
| Icecap K filler | 12.42 | 42 | 42 | 0 |
| Paralux 6001 oil | 38.43 | 130 | 80 | 50 |
| SP 1045 | 1.48 | 5 | 0 | 5 |
| Stannous chloride (anhydrous) | 0.37 | 1.26 | 1.26 | 0 |
| ZnO | 1.05 | 2 | 2 | 0 |

Comparative Example 1 is used as is (SANTOPRENE 201 is a final TPV composition). Table 2B provides the components and their amounts used in preparation of Comparative Example 2.

TABLE 2B

| Formulation | Wt % | PHR | Ingredients added during first step (PHR) | Ingredients added during second step (PHR) |
|---|---|---|---|---|
| VISTALON 3666 | 29.56 | 100 | 100 | 0 |
| Polypropylene | 17.15 | 58 | 58 | 0 |
| Icecap K filler | 12.42 | 42 | 42 | 0 |
| Paralux 6001 oil | 38.43 | 130** | 5 | 50 |
| SP 1045 | 1.48 | 5 | 0 | 5 |
| Stannous chloride (anhydrous) | 0.37 | 1.26 | 1.26 | 0 |
| ZnO | 1.05 | 2 | 2 | 0 |

* 75PHR oil arises from the preformulated VISTALON 3666 resin; and 55 PHR oil is the Paralux 6001.

The first composition used in Inventive Example 1 ("First Composition 1") contained a first ethylene interpolymer and a second interpolymer, each of which is an ethylene propylene diene terpolymer. The properties of the first and second interpolymers and the first composition used in preparation of Inventive Example 1 are shown in Table 3.

TABLE 3

| Property | First Interpolymer | Second Interpolymer | First Composition |
|---|---|---|---|
| Wt % ethylene* | 64 | 73 | '≥65 |
| Mooney Viscosity | 80-85 | 80-85 | 85 |
| Absolute value of difference of wt % ethylene between first interpolymer and second interpolymer | | | 9 |
| [(ML(1 + 4, 125° C.))/Mw(conv)]*1000 | | | 0.48 |
| Δ Mooney vs. First Interpolymer | | ≤10 | |
| Mn (g/mol) (conv) | >50,000 | >50,000 | 68,779 |
| Mw(g/mol) (conv) | | | 174,790 |
| Mw/Mn (conv) | | | 2.55 |
| Mw (g/mol) (abs) | | | 186,791 |
| Mn (g/mol) (abs) | | | 75,759 |
| Mw/Mn(abs) | | | 2.47 |
| Wt % of Interpolymer in First Composition | 40-60 | 60-40 | — |

*As determined by FTIR.

In general terms, it is desirable to produce the first composition under the conditions as explained in U.S. Pat. Nos. 5,977,251 and 6,545,088, and the references therein, the disclosures of which are incorporated herein by reference. The first composition was produced in a solution polymerization process using two continuously mixed, loop reactors, operated in series. The catalyst (for example, a fused ring substituted indenyl titanium complex (CGC)) was activated in situ, with a trispentafluorophenyl borane or tetrakispentafluorophenyl borate activator, and modified methyl aluminoxane scavenger. The first composition was stabilized with 2000 ppm IRGANOX 1076, which is a hindered phenol stabilizer, that is, octadecyl-3,5-ditertiary-butyl-4-hydroxyhydrocinnamate. IRGANOX is a trademark of, and made by, Ciba-Geigy Corporation. Ethylene was introduced in a mixture of a solvent of ISOPAR E (a mixture of C 8-ClO saturated hydrocarbons available from ExxonMobil), propylene and 5-ethylidene-2-norbornene (ENB), forming a first reactor feed stream. The outlet of the first reactor feed stream was consequently a mixture of produced first reactor polymer, solvent, and reduced levels of the initial monomer streams. The molecular weight of the first reactor polymer (and second reactor polymer) may be controlled by adjusting reactor temperature and/or the addition of a chain terminating agent such as hydrogen. Similar to the first reactor feed stream, additional reactive components were added prior to the second reactor. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent two phase flow at any point in the process. After polymerization, a small amount of water was introduced into the reactor stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and reintroduced into the process as appropriate. The overall product characterization is shown in Table i below:

TABLE i

| | Values |
|---|---|
| First Reactor - Product Targets | |
| Ethylene, wt % | 64 |
| ENB, wt % (FTIR) | 4 |
| First Reactor - Results | |
| Mooney (ML 1 + 4, 125° C.) | 90 |
| Final - Product Targets | |
| Ethylene, wt % | 71 |
| ENB, wt % (FTIR) | 5 |
| Final Product Properties | |
| Mooney (ML 1 + 4, 125° C.) | 80-85 |

In one embodiment, monomers, solvent, catalyst, cocatalyst, as well as a small amount of MMAO as a scavenger, were flowed to the first reactor (R1), according to the process conditions in Table ii. The first reactor contents (see Table ii) were flowed to a second reactor (R2) in series. Additional solvent, monomers, catalyst and cocatalyst were added to the second reactor, as well as a small amount of MMAO as a scavenger. The weight percent solids of polymer entering the second reactor was 9.0 percent, by weight, of dry polymer relative to solvent, monomers, and catalyst flows.

TABLE ii

| | R1 | R2 |
|---|---|---|
| Reactor Control Temp. (° C.) | 88 | 105 |
| Solvent (ISOPAR E) Feed (wt %) | 84.9 | 78+ |
| Ethylene Feed (wt %) | 7.6 | 7.5+ |

TABLE ii-continued

|  | R1 | R2 |
| --- | --- | --- |
| Propylene Feed (wt %) | 6.5 | 4.2+ |
| ENB Feed (wt %) | 0.82 | 1.07+ |
| Hydrogen Feed (wt %) | 0.000014 | 0.000019+ |
| Catalyst Conc. (MM lb poly/lb Ti)* | 0.84 | 1.67 |
| Cocatalyst Conc. (molar ratio to catalyst) | 4.0 | 4.0 |
| MMAO** Conc. (molar ratio to catalyst) | 5 | 5 |
| Wt fraction produced in reactor# | 45 | 55 |

*Catalyst addition is defined as one million pounds of polymer (first composition) produced per pound of Ti in the catalyst. Catalyst = (t-butylamido) dimethyl (η5-2-methyl-s-indacen-l-yl) silanetitanium 1,3-pentadiene (other suitable catalysts described in U.S. Pat. No. 5,965,756). Cocatalyst is trispentafluorophenyl borane.
**MMAO-3A available from Akzo Nobel.
+Inclusive of the solvent and unreacted components from the first reactor flowing into the second reactor.
Fraction of the total polymer (first composition) weight produced in the first and second reactor on a dry polymer basis.

The Mooney viscosity (ML(1+4, 125° C.)) of the first composition produced as described above was 80-85. Information regarding production of the first composition is disclosed in WO2011008837, the disclosure of which is incorporated herein by reference (first composition designated EPDM 51 therein). Table 4 provides various physical properties for Comparative Examples 1 and 2 and Inventive Example 1. As can be seen from the information in Table 4, the inventive composition provides physical properties at least as advantageous as those in the Comparative Examples. Specifically, Inventive Example 1 provides hardness, compression set, elongation and tensile strength similar to those of the Comparative Examples. However, Inventive Example 1 provides the ability to form pellets, rather than a bale, as in Comparative Example 1. Therefore, Inventive Example may be extruded without the need for an additional grinding step. Moreover, Inventive Example 1 is not oil extended, as is Comparative Example 2, thereby eliminating the compounding limitations of Comparative Example 2.

TABLE 4

|  | Comparative Example 1 | Comparative Example 2 | Inventive Example 1 |
| --- | --- | --- | --- |
| EPDM |  | VISTALON 3666 | First Composition 1 |
| Hardness (Shore A 10 s) | 69 | 73 | 71 |
| Compression Set (22 hr @ 70° C.) (%) | 35 | 38 | 38 |
| Compression Set (70 hr @ 120° C.) (%) | 58 | 56 | 59 |
| Compression Set (70 hr @ −20° C.) (%) | 14 | 21 | 16 |
| Elongation (%) |  | 202 | 314 |
| Tensile Strength (psi) | 764 | 915 | 857 |
| Oil resistance (%) 903 oil, 168 hours@125° C. | 96 | 105 | 114 |

Inventive Example 1 exhibits much higher elongation over Comparative Examples 1 and 2. Higher elongation results in improved performance in rubber seal applications, weatherstripping and other windshield applications. The remaining properties of Inventive Example 1 were comparative to those of Comparative Examples 1 and 2.

The compounding process of Inventive Example 1 was less energy intensive than that of Comparative Example 2, not requiring additional shredding or granulation step to prepare the EPDM for the precompounding step. Moreover, Inventive Example 1 could be pelletized despite the fact that the EPDM composition of Inventive Example 1 exhibited a much lower Mooney Viscosity (i.e., 85) than that of the EPDM composition of Comparative Example 2 (i.e., 250 of the neat polymer (no filler and no oil)).

$C_2$ content greater than 65% results in higher Tc and ensures free flowing pellets of the composition, Moreover, the combination of $C_2$ amount and the difference in $C_2$ content between the inventive and comparative examples shows that the inventive compositions have free flowing pellets, hold larger than expected amounts of oil and have better low temperature properties. The [Mooney Viscosity/Mw]*1000 is indicative of low levels of low chain branching (LCB). Likewise, the inventive example tan delta is indicative of low levels of LCB.

We claim:

1. A blend composition comprising at least the following components:
    (A) a first composition that is oil-free and comprising the following:
        i) from 43 to 47 percent weight of a first ethylene/propylene/diene interpolymer having a Mooney viscosity, ML(1+4) at 125° C. in the range of from greater than 80 to 85, a molecular weight distribution (MWD) in the range of from 2.05 to 2.5;
        ii) from 53 to 57 percent by weight of a second ethylene/propylene/diene interpolymer having a Mooney viscosity, ML (1+4, 125° C.) in the range of from 80 to 85, wherein the ratio of the ethylene content in the second interpolymer to the ratio of ethylene content in the first interpolymer is greater than or equal to 1.05; and
        wherein the first composition has an MWD less than, or equal to 3.5, a Mooney Viscosity (ML (1+4, 125° C.)) in the range of from 80 to 85, an [(ML 1+4, 125° C.)/Mw(conv)]*1000 greater than 0.429 mole/g, an overall ethylene content from 65 to 74 wt % based on the total weight of the first and second ethylene/propylene/diene interpolymers, as measured by FTIR;
    (B) a thermoplastic polymer; and
    (C) a vulcanization agent;
        wherein said blend composition is in a free-flowing pellet form, and the blend composition has a tensile elongation greater than 310%.

2. The blend composition according to claim 1, wherein the thermoplastic polymer has an MFR from 0.5 to 10 g/10 min.

3. The blend composition of according to claim 1 further comprising an oil.

4. A crosslinked composition formed from the blend composition according to claim 1.

5. An article comprising at least one component formed from the blend composition according to claim 1.

6. The article of claim 5, wherein the article is a profile.

7. The blend composition of claim 1 wherein the first interpolymer is made earlier than the second interpolymer.

8. The blend composition of claim 7 wherein the second ethylene/propylene/diene interpolymer has a MWD less than 3.0.

9. The blend composition of claim 7 wherein the diene content in the second interpolymer to the diene content in the first interpolymer is greater than 1.1.

10. The blend composition of claim 9 wherein the first interpolymer comprises from 2.8 wt % to 4.5 wt % of the diene and the second interpolymer comprises from 4.8 wt % to 8 wt % of the diene.

11. The blend composition of claim 7 wherein the blend composition has a Shore A hardness greater than or equal to 60.

12. The blend composition of claim 11 wherein the blend composition has a tensile strength greater than or equal to 750 psi.

13. The blend composition of claim 12 wherein the blend composition has a compression set (70 hr (@)–20° C.) from 12% to 25%.

14. The blend composition of claim 13 wherein the blend composition has an oil resistance of at least 112%.

15. The blend composition of claim 7 wherein the first composition comprises titanium.

16. The blend composition of claim 7 wherein the first composition comprises boron.

17. The blend composition of claim 16 wherein the first composition comprises titanium.

* * * * *